United States Patent
Raghunath

(10) Patent No.: US 6,314,441 B1
(45) Date of Patent: Nov. 6, 2001

(54) ROBUST METHOD FOR PROVIDING TAP LEAKAGE IN ADAPTIVE EQUALIZER SYSTEMS

(75) Inventor: Kalavai Janardhan Raghunath, Chatham, NJ (US)

(73) Assignee: Agere Systems INC, Berkeley Heights, NJ (US)

(*) Notice: Subject to any disclaimer, the term of this patent is extended or adjusted under 35 U.S.C. 154(b) by 0 days.

(21) Appl. No.: 08/841,749

(22) Filed: Apr. 30, 1997

(51) Int. Cl.$^7$ ........................................ G06F 15/31
(52) U.S. Cl. ............................. 708/322; 708/301
(58) Field of Search ........................ 364/724.19, 724.2, 364/724; 333/166, 18; 375/12, 232, 332; 708/301, 321–323, 332, 318

(56) References Cited

U.S. PATENT DOCUMENTS

| | | | |
|---|---|---|---|
| 4,773,034 | * 9/1988 | Debus, Jr. ........................... | 708/323 |
| 5,175,745 | * 12/1992 | Kaku et al. ........................... | 375/12 |
| 5,260,896 | * 11/1993 | Iwasaki ................................ | 708/322 |
| 5,644,597 | * 7/1997 | Ueda ................................... | 375/232 |
| 5,920,599 | * 7/1999 | Igarashi ............................... | 375/341 |
| 5,937,007 | * 8/1999 | Raghunath ........................... | 375/232 |
| 5,949,819 | * 9/1999 | Bjarnason et al. .................. | 375/222 |
| 6,021,161 | * 2/2000 | Yamaguchi et al. ................ | 375/232 |
| 6,163,572 | * 12/2000 | Velez et al. ......................... | 375/229 |

\* cited by examiner

*Primary Examiner*—Thomas Lee
*Assistant Examiner*—Rijue Mai
(74) *Attorney, Agent, or Firm*—John A. Ligon

(57) ABSTRACT

A method is described for producing coefficient leakage in an adaptive filter/equalizer without the need for using an adder/subtractor for each coefficient. Specifically, a method is provided for incrementally reducing the magnitude of one or more coefficients in an adaptive filter/equalizer solely through a defined manipulation of certain bits in that coefficient, such bit manipulation being carried out on a periodic basis. The period for such bit manipulation will generally track the frequency of adaptation iteration for such a filter/equalizer.

17 Claims, 2 Drawing Sheets

| $\underline{S}$ | $\underline{MSB\ OF\ C}$ | $\underline{S \oplus MSB\ OF\ C}$ |
|---|---|---|
| 0 | 0 | 0 |
| 0 | 1 | 1 |
| 1 | 0 | 1 |
| 1 | 1 | 0 |

| S | MSB OF C | S ⊕ MSB OF C |
|---|---|---|
| 0 | 0 | 0 |
| 0 | 1 | 1 |
| 1 | 0 | 1 |
| 1 | 1 | 0 |

ROBUST METHOD FOR PROVIDING TAP LEAKAGE IN ADAPTIVE EQUALIZER SYSTEMS

CROSS REFERENCE TO RELATED APPLICATIONS

This application is related to U.S. patent application Ser. No. 08/841,744 entitled "METHOD FOR PROVIDING TAP LEAKAGE IN ADAPTIVE EQUALIZER SYSTEMS", (RAGHUNATH-4), now U.S. Pat. No. 5,937, 007, said related application being concurrently filed with the present application and being incorporated herein by reference.

BACKGROUND OF THE INVENTION

A. Field of the Invention

This application is related to the art of digital signal processing and more particularly to methods for providing tap leakage in adaptive equalizer systems.

B. Background Art

It has become commonplace to transmit a wide variety of information across a transmission medium as a digital signal—i.e., a signal for which both time and amplitude are discrete, whether that information is inherently represented in an analog or digital form. In the case of information which is originally in an analog form, the continuous analog signal is sampled at predetermined intervals to arrive at a sequence of discrete numbers—each being representative of a value of the continuous signal at that sample point—such numbers being expressed in a numbering system (generally binary) compatible with the digital transmission scheme. After such a "digitizing" procedure, there is no difference from the standpoint of the transmission infrastructure between such analog-originated information and information which originates in a digital form.

Signal processing of information signals transmitted over a channel occurs in a wide variety of applications and with many objectives. Typical reasons for signal processing include: estimation of characteristic signal parameters; elimination or reduction of unwanted interference; and transformation of a signal into a form that is in some manner more useful or informative. Such processing of discrete (or digital) information signals is carried out by Digital Signal Processing ("DSP") techniques. Applications of DSP techniques currently occur in such diverse fields as acoustics, sonar, radar, geophysics, communications and medicine.

Processing elements which operate on a digital signal frequently occur as filters or equalizers, which are typically represented in the form of a tapped delay line, such as illustrated in FIG. 1, where the "T" of each element 10 represents the period of the sampling frequency for a signal of interest. A characteristic of such a tapped delay line is that an output is a function of an input signal (including, in some cases, prior values of that input signal) and coefficients corresponding to the taps. Algebraically, that relationship would generally be of the form:

$$y_n = C_0 + C_1 x_1 + C_2 x_2 + \ldots + C_n x_n$$

where y represents an output signal, x represents an input signal and $C_0, C_1, \ldots C_n$ are representative of the coefficients.

A comparatively recent variation in digital signal processing is known as adaptive signal processing which has developed concurrently with rapid advance in processing power for DSP hardware devices. A significant difference between classical signal processing techniques and the methods of adaptive signal processing is that the latter are generally applied for time varying digital systems. For the adaptive signal processing case of adaptive filtering, a filter (or equalizer) is caused to adapt to changes in signal statistics so that the output is as close as possible to some desired signal. Adaptive filtering will often be applied for the recovery of an input signal after transmission of that signal over a noisy channel.

Various adaptation algorithms are well known in the art and need not be discussed herein. However, it should be observed that the general adaptation process for an adaptive filter or equalizer operates on the tap coefficients of such a filter or equalizer by iteratively adjusting such coefficients until a desired objective is achieved—e.g. a signal to noise ratio above a defined threshold. The general adaptation process can be described algebraically as:

$$C' = C \pm u$$

where C' is the value of coefficient C after an adaptation iteration and u represents an update term added by the adaptation iteration. It should be understood of course that each coefficient in a filter will be updated in this same manner and that the update term u may, and likely will, vary from coefficient to coefficient. In a conventional digital system those coefficients will be expressed as binary numbers.

With adaptive filters and equalizers, it is well known that the coefficients must be reduced by a small quantity (independent of the update term), on a periodic basis—generally coincident with each iteration of the adaptation process—in order to promote stability of the filter or equalizer. This small periodic reduction in the magnitude of a coefficient is known as "leakage". Without such leakage, some of the coefficients will tend to become too large—primarily due to the effect of truncation of some less significant bits of a coefficient due to use of finite length registers (e.g., 24 bit, 32 bit, etc.) in the computer or DSP hardware used to carry out the processing—which can lead to instability in the system.

In the prior art, leakage is accomplished by providing an adder/subtractor for each coefficient, programmed to subtract a defined small quantity from the coefficient at each cycle of the leakage period. It is, however, common for adaptive filters and equalizers to contain several hundred tap coefficients, and thus a corresponding number of adder/subtractors must be added to the filter system to provide for the required leakage at each coefficient. It is easy to see that this significantly increases the complexity of the filter system.

SUMMARY OF INVENTION

It is accordingly an object of the invention to provide a method for accomplishing leakage for coefficients of an adaptive filter/equalizer which does not rely on the use of an adder/subtractor for each coefficient. To that end, a method is provided for incrementally reducing the magnitude of one or more coefficients in an adaptive filter/equalizer solely through a defined manipulation of certain bits of that coefficient, such bit manipulation being carried out on a periodic basis where such period generally tracks the frequency of adaptation iteration for such a filter/equalizer.

DETAILED DESCRIPTION OF INVENTION

Figures 1, 3:
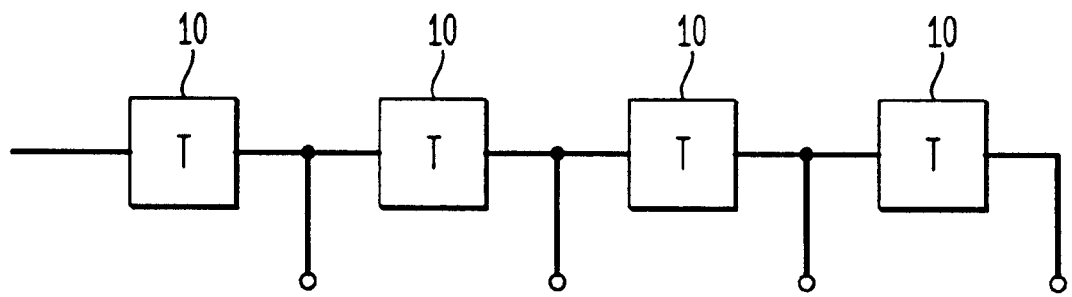
FIG. 1 illustrates in schematic form a tapped delay line as being representative of the form of digital filters/equalizers.
FIG. 3 depicts an exclusive-or truth table for application of the method of the invention.

The discussion following will be presented partly in terms of algorithms and symbolic representations of operations on data bits within a computer system. As will be understood, these algorithmic descriptions and representations are a means ordinarily used by those skilled in the computer processing arts to convey the substance of their work to others skilled in the art.

As used herein (and generally) an algorithm may be seen as a self-contained sequence of steps leading to a desired result. These steps generally involve manipulations of physical quantities. Usually, though not necessarily, these quantities take the form of electrical or magnetic signals capable of being stored, transferred, combined, compared and otherwise manipulated. For convenience of reference, as well as to comport with common usage, these signals will be described from time to time in terms of bits, values, elements, symbols, characters, terms, numbers, or the like. However, it should be emphasized that these and similar terms are to be associated with the appropriate physical quantities—such terms being merely convenient labels applied to those quantities.

It is well known in the art of digital signal processing that adaptive filters and adaptive equalizers are functionally equivalent. In an illustrative case, a transmission line may be modeled as an adaptive filter having a given set of filter coefficients, and a signal passing through that channel can be equalized by passing it through another adaptive filter (or equalizer) with coefficients adjusted so that they approximate an inverse filter to the channel filter. For convenience, the method of the invention will generally be described herein in terms of operation on the coefficients of an "equalizer". It should be understood, however, that the term "equalizer" is used herein to characterize any digital device having a staged operation on an input signal and coefficients corresponding to the action of each such stage, and that the methodology of the invention applies to any such device, whether characterized as an equalizer, a filter, a tapped delay line, an echo canceler, or the like.

It is also well known that the processing of digital signal data is commonly carried out using data represented in the binary number system (base 2) using positional notation. Additionally, because of difficulties in machine processing of negative numbers in traditional sign and magnitude format, it has become the norm to use complements of such numbers along with an additional bit (usually in the most significant bit position) indicative of the sign of the number in question. And, the two's-complement representational form is generally preferred over the one's-complement form. Such binary, two's-complement representation will be used in the discussion following to illustrate the methodology of the invention, and may be considered a part of the preferred embodiment of the invention.

As explained in the Background section, in order to maintain stability in an adaptive equalizer, each of the tap coefficients of the equalizer must be periodically reduced by a small increment, a process referred to as "leakage". In the cross-referenced companion application (RAGHUNATH-4) filed concurrently with this application, a method is provided whereby such leakage may be realized by a probabilistic manipulation of the bits of a given coefficient—specifically, setting the least significant bit (LSB) of the coefficient (or another selected lower order bit) equal to the most significant bit (MSB), or the sign bit, of the coefficient. However, the situation may occur in which the wordlength for adaptive equalizer coefficients will have been improperly chosen, with the result that the LSB of a coefficient will always be inactive (i.e., unchanging). In that circumstance, it can be seen that the bit-manipulation leakage methodology described in the companion cross-referenced application—which, at least in a default mode, relies on setting the LSB equal to the MSB—will be ineffective. It would of course be possible to remedy this problem by applying the bit-manipulation leakage operation to a higher ordered bit (than the LSB), but such a solution assumes prior knowledge that the LSB is not an active bit, which may not be available in all cases.

Accordingly, an alternate bit-manipulation methodology for providing coefficient leakage is disclosed hereafter which will provide satisfactory leakage for equalizer coefficients without regard to whether the LSB of such a coefficient is active. While this alternative methodology represents a slightly greater implementation complexity than the methodology described in the cross-referenced companion application, it can be seen that this alternative methodology provides a more robust leakage process.

Recall the general update relationship for a given coefficient described in the Background section:

$$C'=C \pm u.$$

As explained there, various well-known adaptation algorithms are available to carry out the coefficient update process and all operate, at a fundamental level, to create an updated coefficient value by adding or subtracting an update term (computed by the adaptation algorithm) to the original coefficient value. As would be expected, such adaptation algorithms determine whether the update term is to be added to or subtracted from the coefficient term for a given iteration. Typically a one-bit variable representing whether the update term is to be added or subtracted is maintained by the adaption algorithm, with the usual convention being a "0" representing add and a "1" representing subtract.

With the bit-manipulation leakage process of this methodology, the LSB of the update term is operated on based on the value of the add/subtract variable for that iteration and the MSB of the coefficient C. Specifically, the LSB of the update term is set equal to the output of an Exclusive-Or function ("XOR") having as inputs: (1) the value of the add/subtract variable for the update term and (2) the MSB of the coefficient.

Figure 2:
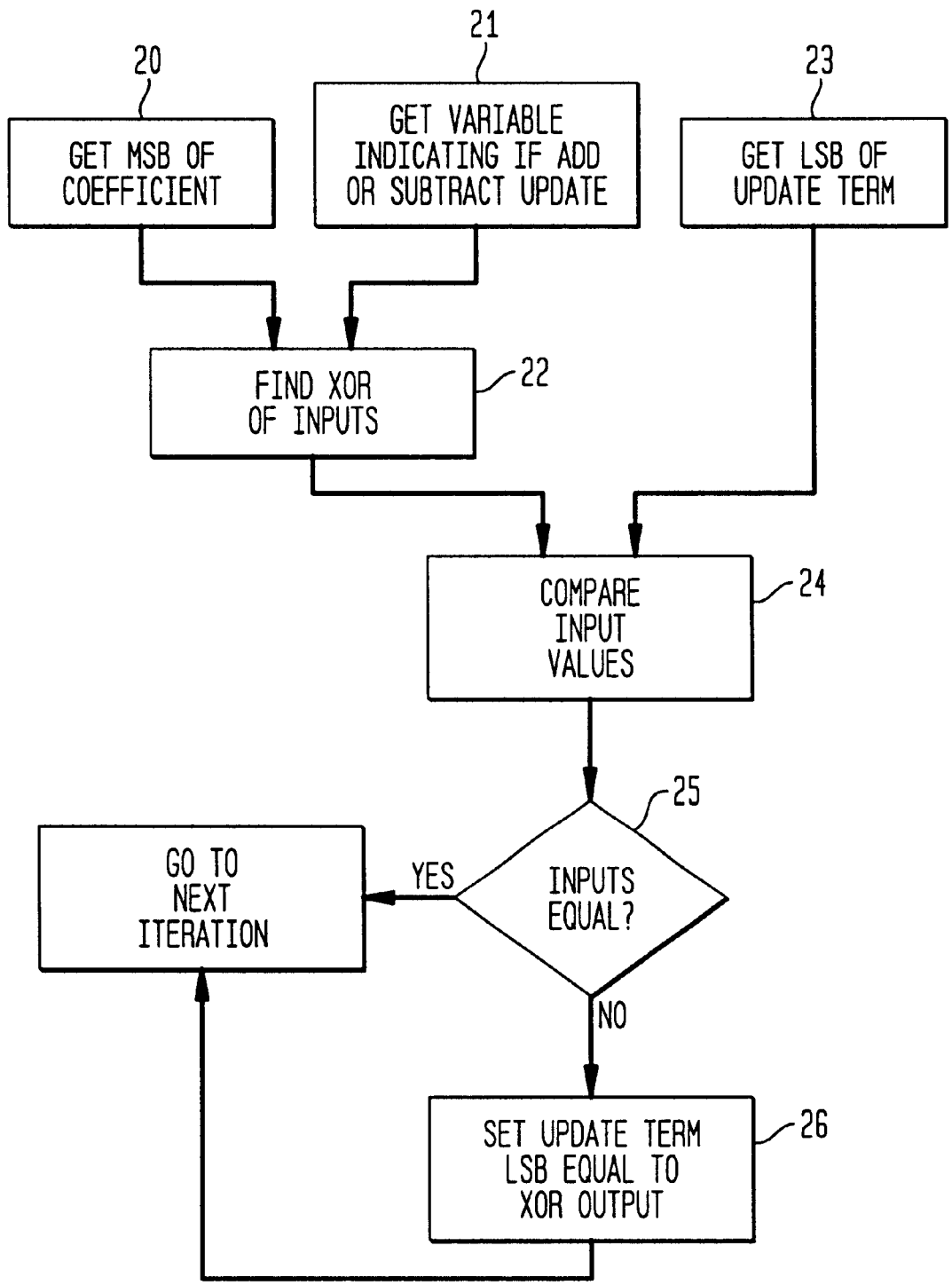
FIG. 2 provides a shematic depiction of the method of the invention.

FIG. 2 provides a schematic representation of this methodology. As shown in the figure, the process begins by getting the value of the MSB of the coefficient term 20 and the value of a variable indicative of whether the update term is to be added or subtracted 21, with those two values representing inputs to an Exclusive-Or (XOR) function 22. The value of the LSB for the update term is then obtained 23 and compared with the XOR output 24. If the two values being compared are equal, the leakage process ends for that adaptation iteration, and the methodology moves on to the next adaptation iteration, as indicated by the yes output of decision function 25. If, on the other hand, the values being compared at 24 are not equal, the method causes the LSB of the update term to be set equal to the XOR output 26, and thereafter moves on to the next adaptation iteration.

The method can be represented algebraically as follows (letting S be a variable such that: S=0 if the update term is to be added, and S=1 if that term is to be subtracted):

SET {LSB of u}={S} XOR {MSB of C}

Permitted values for the term on the right side of the equality in the above relationship are depicted by the Exclusive-Or truth table of FIG. 3, which shows S and MSB of C as inputs to the XOR, and the output thereof. As explained above, the LSB of u would then be set at the value of the XOR output for that iteration.

To illustrate the operation of the method of the invention, consider the case of a positive coefficient, which will thus have an MSB of "0" (representing the sign of the term), and an update term which is to be added (and thus S=0 under the convention previously described). This case, which is represented by the first row of the Exclusive-Or table of FIG. 3, would have an XOR output of "0". Assuming, for purposes of the example, that the update term as computed by the adaptation algorithm has an LSB of "1", setting the LSB of the update term equal to the described XOR output (of "0") will have the effect of reducing the magnitude of the update term by one. Once the coefficient is updated by the addition of this update term, the updated coefficient will similarly have a magnitude less than would have been produced in the absence of the leakage process of the invention. Thus the desired coefficient leakage is achieved. It is of course understood that, in order to achieve the desired leakage for the coefficient C, the operation of the invention on the update term will occur prior to the coefficient update operation for that iteration.

For the case of the XOR output and the LSB of the update term having the same magnitude, it will be apparent that no change would occur in the value of the coefficient for that adaptation iteration, and thus no leakage would occur for that coefficient at that iteration. It will, however, be readily seen that, in a binary system (where each bit will have one of two values—"0" or "1"), the probability of the XOR output and LSB of an update term having the same value would be fifty percent; thus leakage would occur for a given coefficient, on average, once every two cycles of the adaptation process. The inventor has established empirically that such an alternate iteration regime of leakage, at the leakage levels provided by the method of the invention, is adequate to maintain the coefficients within a magnitude required to assure stability of the adaptive equalizer.

It should also be apparent that stronger leakage for a given coefficient may be obtained by choosing a higher order bit (than the LSB) of the update term to set equal to the XOR output, thus reducing the magnitude of the coefficient by a greater amount than would have occurred from such an operation at the LSB position for the update term. Any such operation of selecting a low order bit value for the update term to be set equal to the XOR output value is intended to be encompassed by the method of the invention.

It should be noted that an inactive LSB of the update term will not materially impact the efficacy of this leakage methodology. Even if the update LSB is inactive, the value of S will be randomly changing. Such a randomly changing input to the XOR, where the other input, representing the sign of the coefficient, is likely unchanging for a given coefficient, assures a variability in the XOR output (which becomes the update LSB) to provide the necessary leakage.

CONCLUSION

A probabilistic bit-manipulation methodology for achieving coefficient leakage in adaptive equalizers has been disclosed and described. With the methodology of the invention, such coefficient leakage can be achieved without the use of a separate adder/subtractor for each coefficient in such an equalizer, as must be done in the prior art. The method of the invention for providing coefficient leakage is robust and will be applicable for any adaptive equalizer. Applications of the invention include HDTV demodulation, multimedia digital services, hybrid fiber cable services, cable broadcast modems, PC cable modems, and the like.

Although the present embodiment of the invention has been described in detail, it should be understood that various changes, alterations and substitutions can be made therein without departing from the spirit and scope of the invention as defined by the appended claims.

What is claimed is:

1. A method for providing leakage for a coefficient of an adaptive equalizer, wherein, for a given adaptation iteration, said coefficient is expressed as an algebraic function of a first sequence of bits representing a preceding adaptation iteration of said coefficient and a second sequence of bits representing an update term, said method comprising the steps of:

selecting at least one of said first sequence of bits and at least one of said second sequence of bits;

determining a logical combination of said selected first sequence bit and a bit representative of said algebraic function for a current adaptation iteration;

causing an output value of said logical combination to be compared to said selected second sequence bit; and upon a determination, in the compare step, that said selected second sequence bit and said logical combination output have different values, setting said selected second sequence bit equal to said logical combination output value.

2. The method for providing leakage of claim 1 wherein said selected first sequence bit is a high order bit of said first sequence of bits and said selected second sequence bit is a low order bit of said second sequence of bits.

3. The method for providing leakage of claim 1 wherein said logical combination value is determined from a most significant bit of said first sequence of bits and a bit representative of a sign of said algebraic function for said current adaptation iteration.

4. The method for providing leakage of claim 2 wherein said selected first sequence high order bit is a most significant bit of said first sequence of bits and said second sequence low order bit is a least significant bit of said second sequence of bits.

5. The method for providing leakage of claim 1 wherein said logical combination is an Exclusive-Or.

6. A processor programmed to carry out the method of claim 1.

7. The processor of claim 6 implemented as a digital signal processor.

8. The processor of claim 6 implemented as a general purpose computer processor.

9. A storage medium configured to include a computer program for carrying out the method of claim 1.

10. A storage medium fabricated to include a set of instructions for carrying out the method of claim 1.

11. A method for incrementally reducing the magnitude of a coefficient of an adaptive equalizer over a plurality of adaptation iterations, wherein said coefficient is expressed as an algebraic function of a magnitude of said coefficient at a preceding adaptation iteration and a magnitude of an update term, said method comprising the step of resetting a value of one or more selected bits of said update term during ones of said plurality of adaptation iterations in which an inequality exists between said value of said selected bit and a value determined from a logical combination of a bit selected from said coefficient at said preceding adaptation iteration and a bit representing said algebraic function.

12. The method for incrementally reducing the magnitude of a coefficient of an adaptive equalizer of claim 11, wherein said one or more selected bits of said update term is a low order bit.

13. The method for incrementally reducing the magnitude of a coefficient of an adaptive equalizer of claim 12, wherein said selected low order bit of said update term is a least significant bit.

14. The method for incrementally reducing the magnitude of a coefficient of an adaptive equalizer of claim 11 wherein said bit selected from said coefficient at said preceding adaptation iteration is a high-order bit, and said step of resetting a value of a selected bit of said update term includes setting said selected update term bit equal to said logical combination of said high order bit and said bit representative of said algebraic function for a current adaptation iteration.

15. The method for incrementally reducing the magnitude of a coefficient of an adaptive equalizer of claim 11 wherein said value of said selected update term bit is set equal to a logical combination of a sign bit of said coefficient at said preceding adaptation iteration and a bit representative of a sign of said algebraic function for a current adaptation iteration during said ones of said adaptation iterations in which said inequality exists.

16. A method for incrementally reducing the magnitude of a coefficient of an adaptive equalizer over a plurality of adaptation iterations, wherein said coefficient is expressed as an algebraic function of a magnitude of said coefficient at a preceding adaptation iteration and a magnitude of an update term, said method comprising the step of setting a value of one or more selected bits of said update term equal to a logical combination of a high order bit of said coefficient at said preceding adaptation iteration and a bit representative of said algebraic function for a current adaptation iteration, wherein said step of setting said bit value is carried out during each of a statistical subset of said plurality of adaptation iterations.

17. A method for incrementally reducing the magnitude of a coefficient of an adaptive equalizer over a plurality of adaptation iterations, wherein said coefficient is expressed as an algebraic function of a magnitude of said coefficient at a preceding adaptation iteration and a magnitude of an update term, said method comprising the step of setting a value of one or more selected bits of said update term equal to a logical combination of a sign bit of said coefficient at said preceding adaptation iteration and a bit representative of a sign of said algebraic function for a current adaptation iteration, wherein said step of setting said bit value is carried out during each of a statistical subset of said plurality of adaptation iterations.

* * * * *